United States Patent [19]

Koyama et al.

[11] Patent Number: 4,663,527
[45] Date of Patent: May 5, 1987

[54] RADIOGRAPHIC SYSTEM HAVING A SHEET CORRUGATING STIMULABLE PHOSPHOR SHEET FEEDER

[75] Inventors: Katsuhide Koyama, Tokyo; Shigemi Fujiwara, Ohtawara; Hiroshi Kageyama, Utsunomiya, all of Japan

[73] Assignee: Kabushiki Kaisha Toshiba, Kawasaki, Japan

[21] Appl. No.: 728,670

[22] Filed: Apr. 29, 1985

[30] Foreign Application Priority Data

May 14, 1984 [JP] Japan .................... 59-97954

[51] Int. Cl.[4] .......................... G01T 1/10; B65H 3/08; B65H 5/08
[52] U.S. Cl. ................................... 250/327.2; 271/91; 271/107; 271/161; 378/172; 378/173
[58] Field of Search .......................... 250/327.2, 484.1; 378/172, 173, 174, 182; 271/91, 92, 107, 161, 186, 209

[56] References Cited

U.S. PATENT DOCUMENTS

| 3,859,527 | 1/1975 | Luckey | 250/327.2 |
|---|---|---|---|
| 4,236,078 | 11/1980 | Kotera et al. | 250/363 R |
| 4,282,439 | 2/1981 | Matsuura | 378/171 |
| 4,508,331 | 4/1985 | Kashiwagi | 271/107 |

FOREIGN PATENT DOCUMENTS

| 2256793 | 2/1974 | Fed. Rep. of Germany | 271/91 |
|---|---|---|---|
| 61542 | 5/1980 | Japan | 271/91 |
| 36242 | 2/1984 | Japan | 378/172 |
| 1386945 | 3/1975 | United Kingdom | 271/209 |

Primary Examiner—Janice A. Howell
Assistant Examiner—Constantine Hannaher
Attorney, Agent, or Firm—Oblon, Fisher, Spivak, McClelland & Maier

[57] ABSTRACT

A radiographic system for obtaining a visible radiation image by use of a stimulable phosphor sheet, including a spot shot apparatus featuring a transport system for transporting the stimulable sheets from the supply magazine to the receiving magazine through a park and exposure station at which radiation is directed to the sheet. A plurality of the stimulable phosphor sheets are stacked in a supply magazine and are taken-up one by one from the stack in the supply magazine. The take-up feed mechanism for taking-up stimulable phosphor sheets one by one from the supply magazine and for feeding the taken-up stimulable phosphor sheet to a transport system via a sheet advance roll assembly includes a take-up means for drawing a single stimulable phosphor sheet from a stack of stimulable phosphor sheets stored in the supply magazine by using a vacuum effect, a sheet corrugating device for corrugating the stimulable phosphor sheet in combination with the take-up means, and roll assembly for feeding the drawn stimulable phosphor sheet to the transport system for radiography by clamping it therebetween.

18 Claims, 41 Drawing Figures

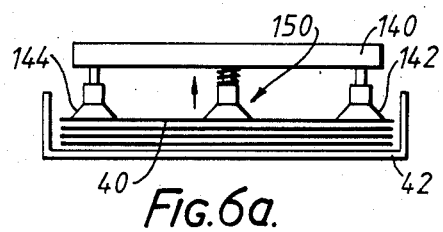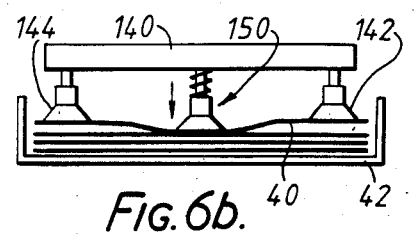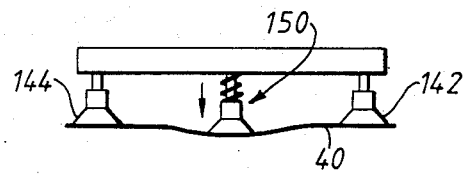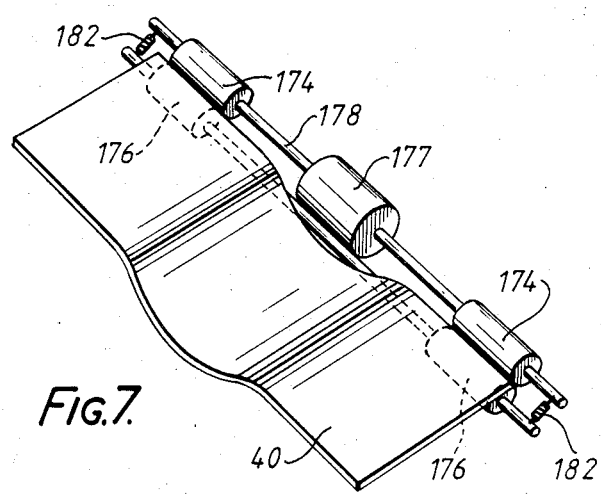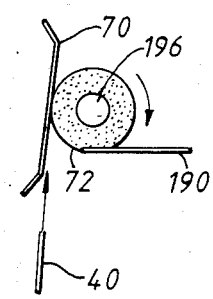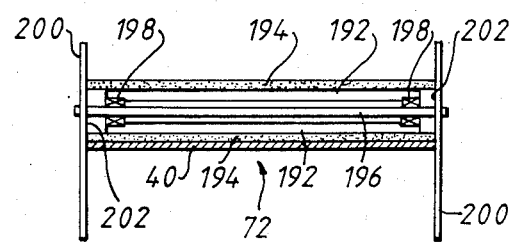

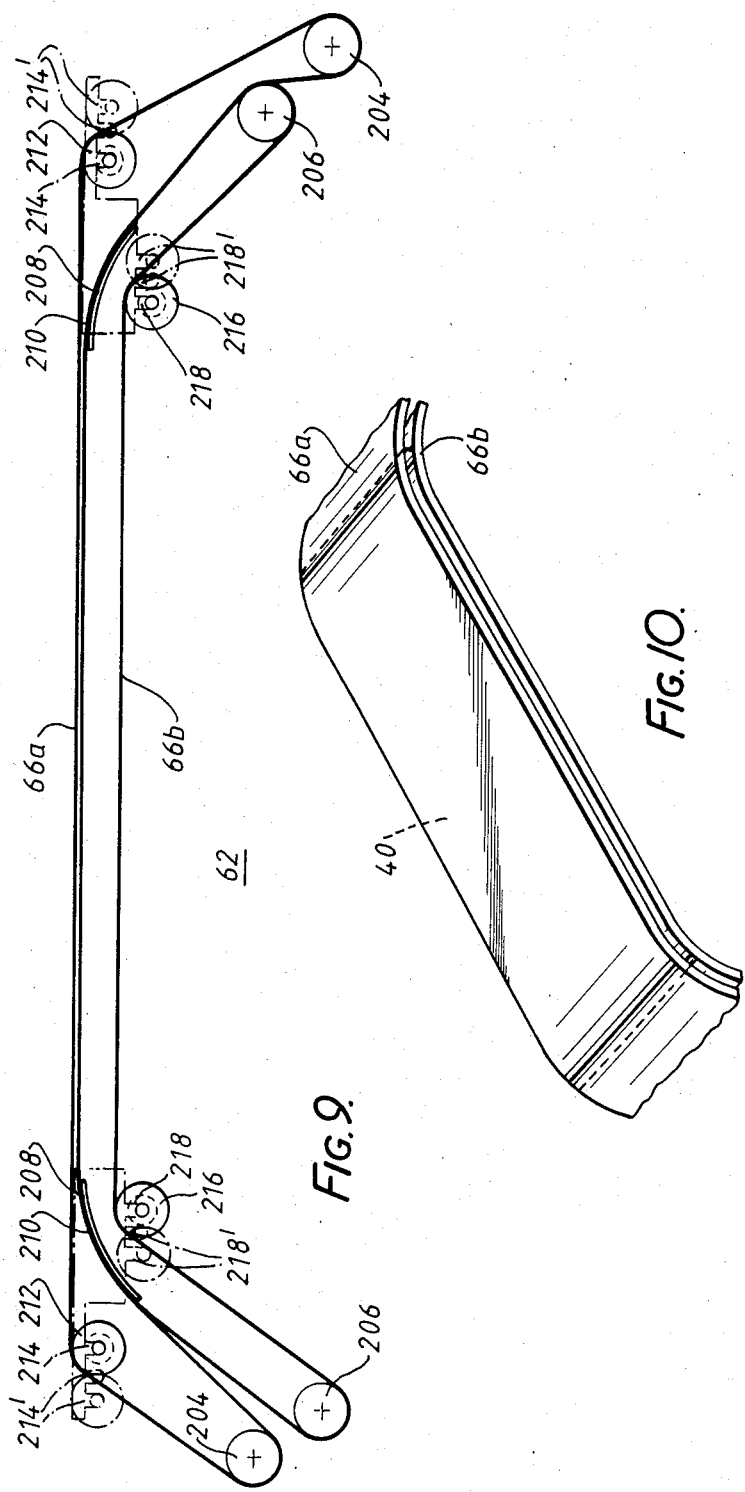

RADIOGRAPHIC SYSTEM HAVING A SHEET CORRUGATING STIMULABLE PHOSPHOR SHEET FEEDER

BACKGROUND OF THE INVENTION

1. Field of the Invention

The present invention relates generally to serial radiographic systems and more particularly to a system for obtaining a visible radiation image by use of a stimulable phosphor sheet.

2. Discussion of Background

When certain kinds of phosphors are exposed to radiation such as X-rays, α-rays, β-rays, γ-rays or ultraviolet rays, they store a part of the energy of the radiation. Then, when the phosphor which has been exposed to the radiation is exposed to a stimulating ray such as visible ray, light is emitted from the phosphor in the pattern of the stored energy of the radiation. A phosphor exhibiting such properties is referred to as a stimulable phosphor.

A serial radiographic system adapted especially for using the stimulable phosphor is described in U.S. Pat. No. 4,236,078, entitled, METHOD AND APPARATUS FOR RECORDING AND REPRODUCING A RADIATION IMAGE, issued to Kotera et al. This patent discloses a method and apparatus of radiation image recording and reproducing which employs a radiation image storage panel comprising a stimulated phosphor for medical diagnosis. The stimulable phosphor is first exposed to a radiation to have a radiation image stored therein and is then scanned with a stimulating ray which causes it to emit light in the pattern of the stored image. The light emitted from the stimulable phosphor upon stimulation thereof is photoelectrically detected and converted to an electric signal which is processed as desired to reproduce a visible image of a quality suitable for viewing and diagnostic purposes.

In the radiation image recording and reproducing method described above, the final visible image may be reproduced in the form of a hard copy or may be displayed on a cathode ray tube. The stimulable phosphor sheet used in this method may take various forms such as panel, drum or the like, which are herein generally referred to as an imaging plate (IP). For reasons of economy, it is desirable that the IP be used repeatedly in many separate radiographic operations, such as 1,000 operations.

In serial radiography, a series of radiographs are produced by sequentially feeding a series of IPs, one at a time, to an exposure station. The exposure station is aligned with a source of X-rays which directs a beam of X-rays through the exposure station for exposing the IPs.

A stack of IPs is stored in a supply magazine. A transport and drive system transports each IP from the supply magazine to the exposure station at high speed. After exposure, each IP is transported to, and deposited in, a receiving magazine. The transport and drive system concurrently delivers an unexposed IP to the exposure station and an exposed IP to the receiving magazine.

An imaging device to take serial radiographs on the IPs at high speed is called a spot shot apparatus. The spot shot apparatus presents an IP at an exposure station in the path of radiation emission from a radiation source carried in the table body which supports a patient in a selected horizontal, vertical or inclined attitude during the taking of radiographs. In the spot shot apparatus, the transfer of the IPs from the supply magazine to the receiving magazine through the exposure station is effected by a transport system and a movable carriage which will position one IP for exposure.

Such a transport system should be compact, transport IPs at high rates with accuracy, and to avoid any possibility of a IP being scratched or otherwise damaged during transport or exposure to assure that a timely exposure will accurately record an event of short duration.

Especially damage to the phosphor layer of the stimulable phosphor sheet (IP) is a severe problem for the radiographic system as above described. The destruction of image data due to damages to the IP is highly undesirable in the radiographic system.

In a prior spot shot apparatus, unexposed IPs in the supply magazine are drawn out one by one by means of vacuum suction device and delivered into the transport system by means of paired rolls which are disposed near the take-out opening of the supply magazine. The drawn IP is moved into the paired rolls by being held by the vacuum suction device at the forward edge portion of the IP. The cantilevered type holding of the IP only at one end portion is undesirable because the drawn IP is bent due to its flexibility to that the trailing edge portion opposite to the forward edge of the drawn IP contacts with the next unexposed IP stacked in the supply magazine. As a result, the next unexposed IP is scratched or rubbed on the phosphor layer thereof.

SUMMARY OF THE INVENTION

Accordingly, an object of the present invention is to provide a novel serial radiographic system having an IP feed mechanism for drawing the stimulable phosphor sheet one by one out of the supply magazine and forwarding it to a transport system for feeding the unexposed stimulable phosphor sheet to the exposure station without damaging the phosphor layer of the IP.

Another object of the present invention is to provide in a radiographic system a novel IP feed mechanism for drawing the stimulable phosphor sheet out of the supply magazine without bending the trailing end of the sheet by increasing the section modulus of the sheet.

A further object of the invention to provide in a radiographic system a novel and improved feed mechanism for causing the stimulable phosphor sheet being taken out of the supply magazine to corrugate and for drawing the sheet out in rigid form.

Another object of this invention is to provide in a radiographic system a novel and improved feed mechanism for drawing the stimulable phosphor sheet out of the supply magazine while avoiding frictional contact with the phosphor layer of the sheet.

Yet a further object of the invention is to provide a novel and improved feed mechanism for drawing the stimulable phosphor sheet out of the supply magazine, which can eliminate misfeed, such as feeding a plurality of IPs at one time to the transport system through the advance rolls by providing air gaps between the IP being drawn and the next IP stacked in the supply magazine.

These and other objects are achieved according to the present invention by providing a radiographic system with an IP feed mechanism which, during each feed cycle, draws out and feeds a single stimulable phosphor sheet from a stack of stimulable phosphor sheets stored in the supply magazine. The IP feed mechanism includes a take-up means for drawing a single stimulable phosphor sheet from a stack of stimulable phosphor sheets stored in the supply magazine by using a vacuum effect, a corrugation means for corrugating the stimulable phosphor sheet in combination with the take-up means, and roll assembly for feeding the drawn stimulable phosphor sheet to the transport system for radiography by clamping it between paired rolls.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIGS. 6a and 6c are a cross-sectional views of the take-up mechanism for use in the transport and drive system of FIG. 2;

FIG. 7 is a partial perspective view showing the relationship of the carrying rollers and the sheet forwarded in the transport and drive system of FIG. 2;

FIGS. 8a and 8b respectively are a simplified side view and a cross-sectional view of a light-tight mechanism provided in the transport and drive system of FIG. 2;

FIG. 9 is a cross-sectional view of the portion of the transport and drive system corresponding to the exposure station shown in FIG. 2;

FIG. 10 is a partial perspective view of a belt loop arrangement for transporting the stimulable phosphor sheet used in the transport and drive system of FIG. 2;

DETAILED DESCRIPTION OF A PREFERRED EMBODIMENT

General Arrangement

Figure 1:
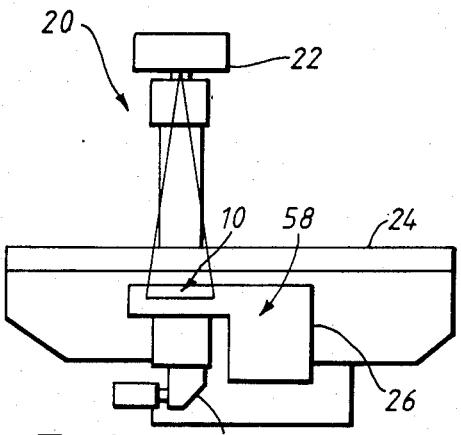
FIG. 1 is a schematic diagram of a radiographic system having a transport and drive system for stimulable sheets according to this invention.

Referring now to the drawings, wherein like reference numerals designate identical or corresponding parts throughout the several views, and more particularly to FIG. 1 thereof, the general arrangement of a serial radiographic system 20 constructed in accordance with the present invention includes an X-ray tube 22 which directs an X-ray beam towards a patient (not shown) disposed on the patient table 24, a spot shot apparatus 26 including a transport and drive system for receiving X-rays from the tube 22, which is positioned under the table 24, and an image intensification tube 28 coupled to a display apparatus (not shown) for providing a fluoroscopic image of the patient. Because the image tube 28 underlies the exposure station 10 in the spot shot apparatus 26 for taking radiographs on the stimulable sheets, it is able to provide unobstructed fluoroscopy without interfering with the radiographic procedure.

Figure 2:
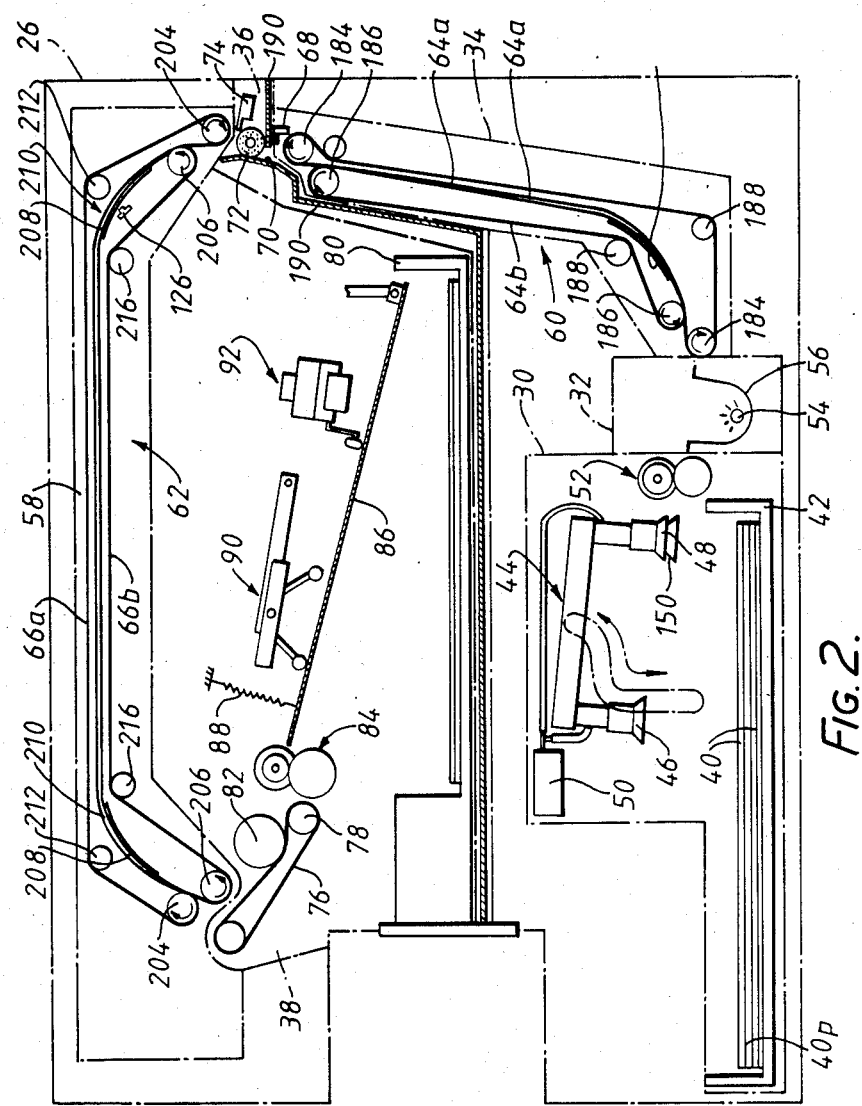
FIG. 2 is a diagrammatic perspective view of a spot shot apparatus having a transport and driving system for stimulable phosphor sheets according to this invention.

Referring now to FIG. 2, the spot shot apparatus 26 is seen to include a supply system 30 for unexposed stimulable phosphor sheets 40, a second noise erasing apparatus 32, a transport system 34, a light-tight mechanism 36, and a receiving system 38 for exposed stimulable phosphor sheets 40 transported by the transport system 34.

The supply system 30 includes a supply magazine 42 to be removed from the supply system 30 to enable convenient loading of unexposed stimulable phosphor sheets 40 (hereinafter referred to as IPs) in a darkroom, an IP feed mechanism 44 including take-up arms 46, 48 for taking-up the IPs one by one from the supply magazine 42 by suction of a vacuum pump 50, and carrying rollers 52 for forwarding an exposed IP 40 to the transport channel of the transport system 34. The IPs 40 are suction lifted and taken-up one at a time by the take-up arms 46, 48, which apply suction to the side of the IP opposite the phosphor layer side of IP 40. The taken-up sheet 40 is moved to the transport system 34 by the carrying rollers 52.

The second noise erasing apparatus 32 (hereinafter referred to as the erasing apparatus) includes a lamp 54, for example, a tungsten filament, fluorescent, sodium, xenon or iodine lamp, and a reflector 56 shaped and disposed so that IP 40 is exposed uniformly and widely by the light of the lamp 54. Thereby, the efficiency of exposure to light of the lamp 54 for IP 40 is increased. The erasing apparatus 32 is synchronized with the movement of IP 40 so that it emits light when the forward end of the taken-up IP 40 reaches the carrying rollers 52. The IP 40 is exposed to light when it is passed over the erasing apparatus 32 at a predetermined speed by the carrying rollers 52.

A transport system 34 is provided in spot shot apparatus 26. During an operating cycle the transport system 34 concurrently transports an unexposed IP 40 from the supply magazine 42 to a preexposure station 58 close to the exposure station 10 in part defined by the X-ray tube 22, and an exposed IP 40 from the preexposure station 58 to the receiving system 38. The transport system 34 has two continuous band portions 60, 62. One portion 60 transports the IP 40 from the carrying roller 52 to the light-tight portion 36; the other 62 transports the IP 40 from the light-tight portion 36 through the preexposure station 58 to the receiving system 38. The portions 60, 62 each include respective pairs of continuous band loops 64a, 64b, and 66a, 66b, which run around roller wheels in a path. The IP 40 is transported in the transport channel defined by these band loops (64a, 64b), (66a, 66b) while being held between two facing band loops (64a, 64b) or (66a, 66b). The IP 40 is transported by the transport system 34 and stopped at the position where the IP 40 contacts the position detector 68 disposed in the forward end thereof. The IP 40 stays at this position during a predetermined period without being transported to the second portion 62 of the transport system 34.

The light-tight mechanism 36 includes a guide plate 70 for the IP 40, a light-tight roller 72 for forwarding the IP 40 with the guide 70, and a defect detector implemented 74 by suitable means. These components are arranged to prevent light from the erasing lamp 54 entering into the darkroom.

The second portion 62 of the transport system 34 includes a top band loop 66a and a bottom band loop 66b which can be moved in the direction perpendicular to the path of the band loops 66a, 66b. Thus, an unexposed IP 40 is moved by the loops 66a, 66b to a preexposure or park position, and then the entire assembly of the loops 66a, 66b with the unexposed IP is moved laterally to a station 10 shown in FIG. 1 where the X-ray beam from the source 22 passes through an adjacent patient. Movement of the IP 40 into the exposure station 10 is carried out after the IP 40 is advanced to a precise position on the band loops 66a, 66b, for example, a central portion of the second transport portion 62. If a defective IP 40 is detected by the defect detector 74, it will be transported directly to the receiving system 38 without being moved into the exposure station 10.

The receiving system 38 includes a drive belt 76 riding in the belt pulleys 78 for feeding and depositing the exposed IP 40 in the receiving magazine 80. A combination of a follower roll 82 and an ejector roll 84 are provided for gripping the exposed IP 40 and feeding it into the receiving magazine 80. The receiving magazine 80 for receiving the exposed IP 40 is mounted on tracks (not shown) to facilitate removal to a darkroom for loading and unloading of the exposed IP 40. A spring-biased press pad 86 is arranged downstream in the feeding path behind the ejector rolls 84. This press pad 86 is pivotable about an axis at one end of the pad 66 and is urged by spring 88 perpendicular to the direction of the IP feeding. A suitable pressure mechanism 90 pushes against the press pad 86 to load the exposed IPs 40 uniformly in the receiving magazine 80. A bar-code reader 92 is provided for reading the identification of IP 40 and providing electrical signals corresponding thereto.

Figure 3:
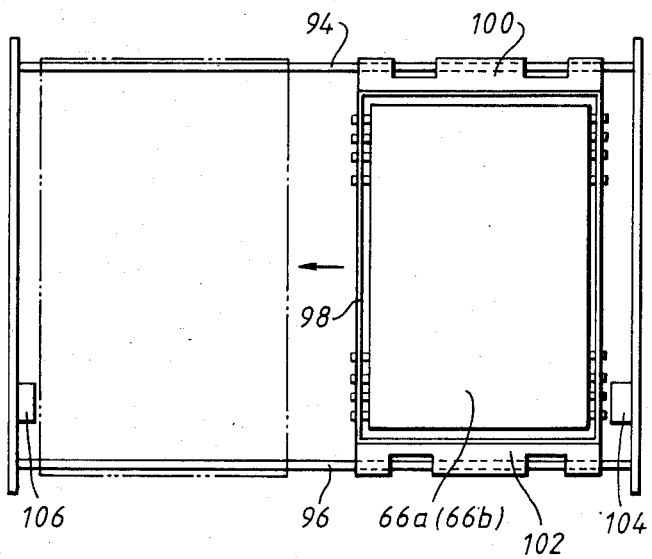
FIG. 3 is a partial view showing a shot carriage and the guide arrangement employed in the transport and driving system shown in FIG. 2.

As shown in FIG. 3, the band loops 66a, 66b with the unexposed IP 40 are moved to an exposure position 10 under the X-ray source 22 from the parked position (preexposure station 58) along parallel guide rods 94, 96. The band loops 66a, 66b are supported by a carriage 98 having slide portions 100, 102 which slide on the guide rods 94, 96. Position detectors 104, 106 are disposed for detecting the movement of the carriage 98 in the path from the parked position 58 to the exposure position 10.

In operation, a supply magazine 42 which had previously been loaded in a darkroom with a plurality of the IPs 40 is inserted in the housing of the spot shot apparatus 26. An empty receiving magazine 80 is also inserted into the housing structure. The controller is programmed for the beginning of a feed cycle which feeds the selected IP 40 along the transport channel from the supply magazine 42 through the exposure station 10 to the receiving magazine 80.

Figure 4:
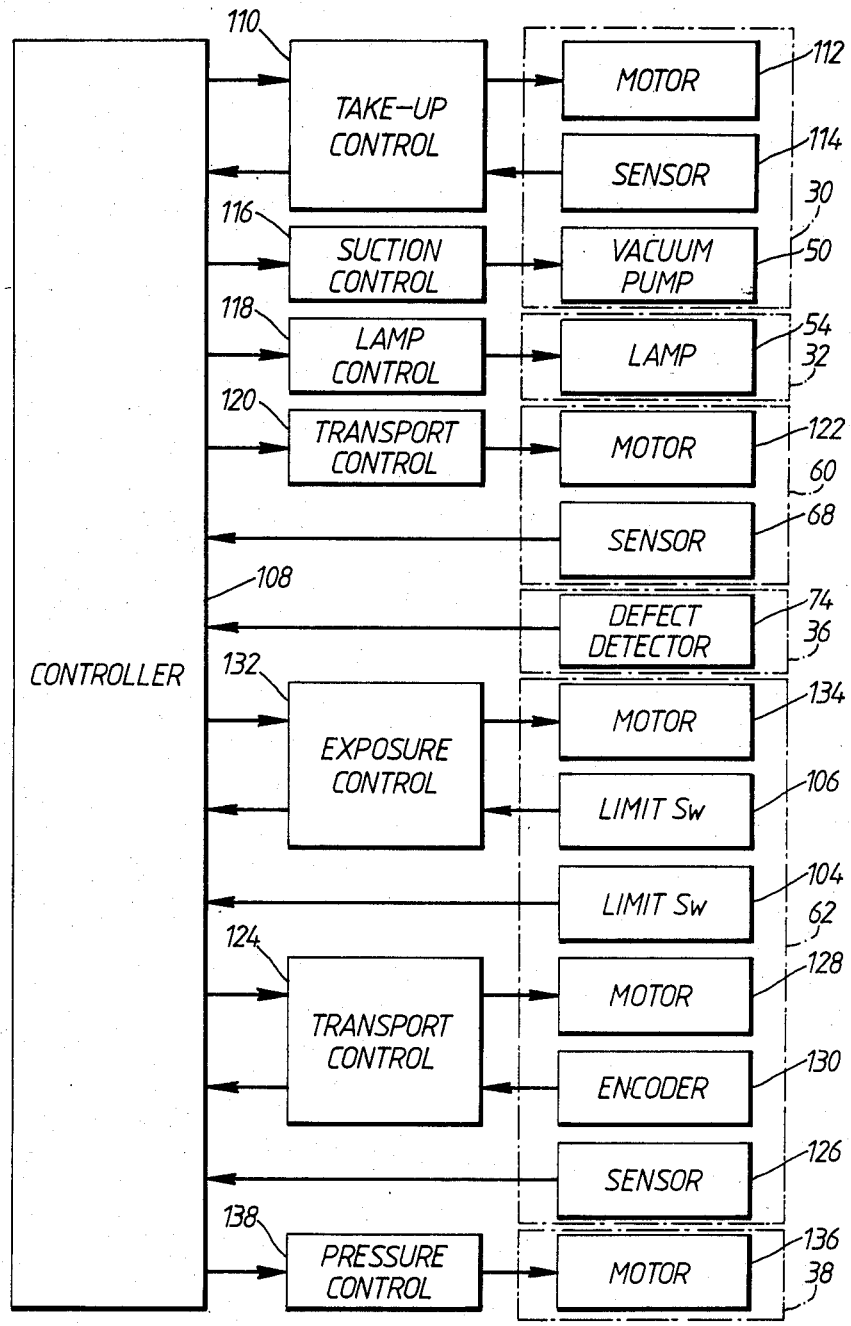
FIG. 4 is a schematic diagram of the control system for the transport and drive system according to this invention.

Referring to the schematic diagram of the control system which controls the feed cycle shown in FIG. 4, to initiate a feed cycle, the take-up control mechanism 110 is actuated causing the transport system 34 to initate feeding. The take-up arms 46, 48 operate to take-up the uppermost IP 40 in the supply magazine 42 and forward it to the carrying rollers 52 under control of the take-up control mechanism 110 for driving a reversible motor 112 responsive to the output signal of a position sensor 114 monitoring the positions of the arms 46, 48. A suction control mechanism 116 controls the actuation of the vacuum pump 50. A lamp control mechanism 118 conditions the light beam from the lamp 54 in the erasing apparatus 32. The taken-up IP 40 is fed past the erasing apparatus 32 to the transport system 34 from the carrying rollers 52. A transport control mechanism 120 conditions the actuation of motor 122 synchronized with the drive of the carrying rollers 52 responsive to the output signal of a position sensor 68 which monitors the arrival of the IP 40 at the forward end of the first band portion 60 within the transport system 34. After a predetermined time period, the motor 122 supplies a high speed drive to advance the IP 40 to the second band portion 62 within the transport system 34. The second transport control mechanism 124 for the pair of continuous band loops 66a, 66b in the portion 62 of the transport system 34 conditions the actuation of motor 128 to position the IP 40 in the predetermined preexposure position 58 in the path responsive to both the output signal of the position sensor 126 and the output signal of the rotary encoder 130. The position sensor 126 is disposed in the feed path for monitoring the arrival of the IP 40 at the front end of the second band loops 66a, 66b. The rotary encoder 130 monitors the rotational position of the shaft of motor 128. After that, the carriage 98 supporting the second band loops 66a, 66b is moved horizontally to the exposure station 10 to take a radiograph, and returned to the preexposure station 58. This motion of the carriage 98 is monitored by the limit switch 104 providing an output signal whenever the carriage 98 moves to the preexposure station 58. The second transport control mechanism 124 also drives a motor 128 to forward any IP 40 which is found to be defective by the detector 74 to the receiving system 38 without being advanced to the exposure station 10. Under control of an exposure control mechanism 132, the carriage 98 holding the second band loops 66a, 66b is moved from the parked position 58 to the exposure position 10 by motor 134. This motion of the carriage 98 is synchronized with the timing of the exposure of X-ray source 22 operated by an operator. The X-rays from the X-ray source 22 are directed to the patient after the carriage 98 is found to arrive at the exposure position by the limit switch 106, as shown in FIG. 3.

After the radiograph has been taken on the IP 40, the exposed IP 40 is transported to the receiving system 38 under control of the second transport control mechanism 124. The IP 40 transported from the second band loops 66a, 66b is further fed to the receiving magazine 80 by the drive belt 76 and drive rolls 84. In the receiving system 38, a pressure control mechanism 138 controls a reversible motor 136 for driving the pressure mechanism 90 which supplies the pivotable motion to the press pad 86. The pressure control mechanism 138 controls the movement nipping drive rolls 84 to allow the smooth rotation of the press pad 86 without contacting with each other, and controls the scanning of the bar code reader system 92.

The supply system 30 is shown in detail in FIGS. 2, 5a-5b, 6a-6c and 7. The supply magazine 42 includes a housing having a floor, sides, a front and a back. A stack of IPs 40 is stored in the supply magazine 42. Each IP 40 is loaded with the phosphor layer thereof facing the floor of the supply magazine 42. The IP feed mechanism 44 is arranged above the supply magazine 42 to take out an unexposed IP 40 from the supply magazine 42, and forwardly transfer the unexposed IP 40 to the carrying rollers 52.

The IP feed mechanism 44 includes a support structure 140 having paired vacuum suction devices 142 and 144 provided at the free end of take-up arms 46 and paired vacuum suction devices 146 and 148 provided at the free end of take-up arms 48 for drawing IPs 40 out of the supply magazine 42 by using a vacuum effect, and a corrugate arm 150 having a vacuum suction device 152, a holder 154 for the vacuum suction device 152, and a bias spring 156 disposed between the support structure 140 and the holder 154. These vacuum suction devices 142, 144, 146, 148 and 152 are connected to the vacuum pumps 50. The paired vacuum suction devices 142, 144 and vacuum suction device 152 of the corrugation arm 150 are disposed near the carrying rollers 52 above the take-out opening of the supply magazine 42 to hold the front edge portion of IP 40, and the paired vacuum suction devices 146, 148 are disposed rearward to hold the middle portion of IP 40. The vacuum suction device 152 of the corrugation arm 150 sticks out with respect to the vacuum suction device 142 and 144. The support structure 140 is mounted on an axle 158 which engages the opposed guide grooves 160, shown schematically via a pair of bearings 162, it being understood that the grooves 160 are provided in opposed plates (not shown). The axle 15 is coupled to a pair of metal links 164 which are pivotally connected to a pair of metal links 66 rigidly mounted to an axle 168. A drive motor 112 has a motor output shaft which carries a motor sprocket 169. A drive chain 170 rides in the sprocket 168. The sprocket 172 mounted on an end of the axle 168 is driven by the chain 170. As viewed in FIG. 2, these vacuum suction devices 142, 144, 146, 148 and 152 are moved to approach the uppermost IP 40 in the supply magazine 42 according to the guide grooves 160 and then are returned to the uppermost position defined by the guide grooves 160 by the motor 112 under control of the take-up control mechanism 110.

Figure 5A:
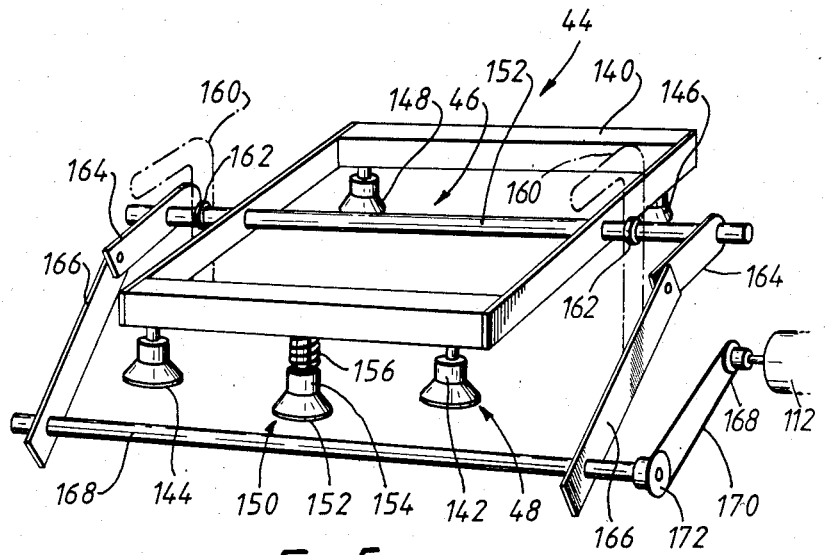
FIGS. 5a and 5b is a perspective view of a take-up mechanism and arrangement with carrying rollers for use in the transport and drive system of FIG. 2.
Figure 5B:
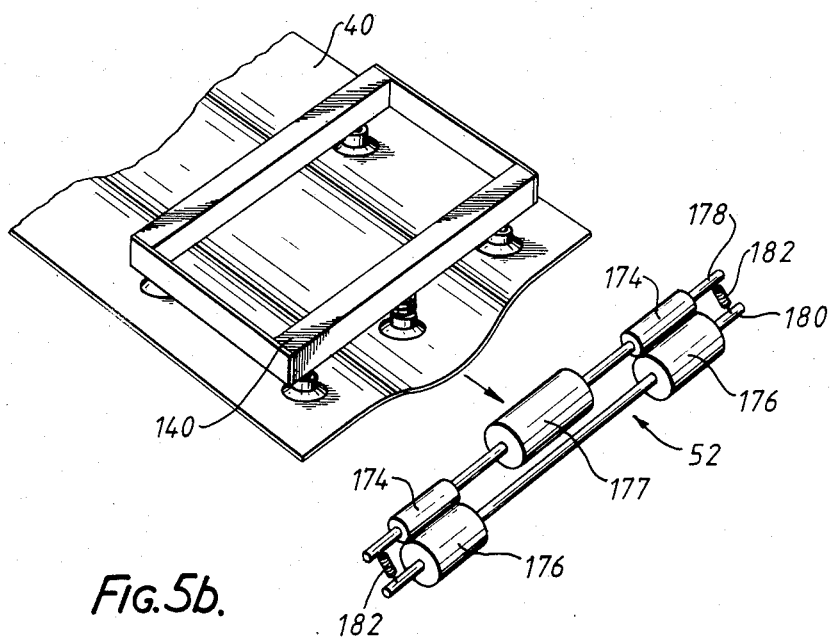

As shown in FIG. 5b, the carrying roller unit 52 is composed of drive rolls 174 paired with respective follower rolls 176, and a large diameter corrugation roll 177. The paired drive rolls 174 are mounted on a upper shaft 178, the paired follower rolls 176 are mounted on a lower shaft 180, and the corrugation roll 177 is mounted on the shaft 178 and is disposed between the paired drive rolls 174. An IP 40 is fed with the edge portions thereof passed through the respective paired drive rolls and follower rolls. The paired springs 182 are stretched between the extended portion of the shaft 178 of the drive rolls 174 and the extended portion of the shaft 180 of the follower rolls 176 so as to press the drive rolls 174 resiliently against the follower rolls 176.

Operation of the IP feed mechanism 44 is as follows. The motor 112 rotates at operating speed in a forward direction, and the sprocket 172 causes the axle 168 to rotate. The support structure 140 is moved downwardly in close vicinity to the stack of IPs 40 in the supply magazine 42 according to the guide grooves 160 via the paired links 164 and 164 and the axle 158. The corrugation vacuum suction device 152 contacts with the uppermost IP 40 of the stack of IP, and contacts the surface of the IP substrate, the fluorescent layer being provided on the side opposite to the side contacted by the suction device 152. After the contact of the corrugation vacuum suction device 152 with the IP 40, all the vacuum suction devices 142, 144, 146 and 148 contact with the surface of the substrate of IP 40 as shown in FIG. 6a. The suction devices draw a single IP 40 out of the take-out opening by using the vacuum effect of the vacuum pump 50. After that, the motor 112 rotates in a reverse direction to cause the support structure 140 to return upwardly guided by the guide grooves 160. The corrugation vacuum suction device 152 is biased downwardly by the spring 156 via the supporter 154, thereby the IP 40 corrugates in the traverse direction thereof as shown in FIG. 6b. The corrugation of IP 40 takes place over the whole of the IP by holding of the vacuum suction devices 146 and 148 on the central portion of the IP 40. The IP 40 is taken up rigidly, and carried to the carrying rolls unit 52 because the section modulus effect of IP 40 is so increased by the corrugation as to avoid bending of IP 40 in a direction towards the supply magazine. As seen in FIG. 6c, the complete area of IP 40 is lifted simultaneously by the support structure 140 without touching the other IPs 40 of the stack stored in the supply magazine 42 with the traverse edge thereof. As a result, damage to the fluorescent layer of IP 40 caused by frictional dragging contact with the next adjacent IP 40 is avoided, the separation between the uppermost IP 40 and the next adjacent one is completed by the air gap made by the corrugation of IP. Further electrical coupling between IPs 40 is eliminated, whereby a plurality of IPs 40 are not transferred to the carrying rolls unit 52 at one time.

When the drawn IP 40 touches the nipping rolls 174 and 176, the IP 40 strikes between the drive rolls 174 and the follower rolls 176 and is fed to the transport system 34, as shown in FIG. 7. The surface of the substrate of IP 40 is sucked by the vacuum suction devices, and pressed by the drive rolls 174 to be transported, whereby there is no possibility of damage to the fluorescent layer of IP 40 caused by frictional contact of the fluorescent layer. It is to be noted that the fluorescent layer, which faces downward as shown in FIGS. 5b and 7, makes contact with the follower rolls 176, thereby avoiding frictional slippage, and possible damage to the fluorescent layer of the IP. In addition, the corrugation roll 177 is between the drive rolls 174 in the carrying rolls unit 52 to corrugate the IP 40 during its passage through the carrying rolls unit 52 again to avoid vertical bending of the IP, which would result in frictional dragging of the IP. Accordingly firmness of IP 40 over the complete area thereof is maintained so that the IP 40 is fed to pass over the erasing apparatus 32, and strike the transport system 34 without frictional contacting of the fluorescent layer of the IP.

The erasing apparatus 32 is disposed as shown in FIG. 2 to erase undesirable radiation energy stored in the IP 40 which causes noise to appear in the visible radiation image reproduced from a reused IP. The erasing apparatus 32 includes a lamp 54, a reflector 56 and power supplier (not shown) which is an AC source to supply power to maintain the power load of the lamp 54 constant using a feed-back control.

Referring to FIGS. 2, 9 and 10, the transport system 32 has the first portion 60 for transporting the selected IP 40 from the carrying rolls unit 52 to the light-tight roll assembly 36 and the second portion 62 underlying the preexposure station 58 along a feed path from the light-tight roll assembly 36 to the receiving system 38. The first portion 60 of the transport system 34 includes a pair of endless drive bands 64a and 64b between which the IP 40 is held for transporting the IP 40 and which are arranged in close serial proximity. Each band portion 64a or 64b runs around respective paired drive roller drums 184 or 186. The entrance to the first band loops 64a and 64b includes a guide plate 188 to connect with the feed path over the erasing apparatus 32 from the carrying roll unit 52 and to bend the band portions 64a and 64b arcuately. The length of band loops 64a and 64b in a forward direction is substantially the same as that of IP 40. The position sensor 68 is provided at the forward end of band portions 64a and 64b. The drive roller drums 184 and 186 are braked for a predeterminable time responsive to the output signal from the position sensor 68 whenever the IP 40 has reached the forward end of the first band loops 64a and 64b. When the previous IP held in the carriage 98 is shifted from the exposure station to the park position, and the exposed IP is forwarded to the receiving system 38, the drive roller drums 184 and 186 then rotate again to drive the band loops 64a and 64b. A pair of follower drums 188 is provided to stretch the band loops 64a and 64b.

The IP 40 on which the erasing has been conducted is transported to enter between the band loops 64a and 64b and to be advanced in the curved transport channel formed by the band loops 64a and 64b until the IP 40 reaches the forward end thereof. When the position sensor 68 senses the leading or front edge of IP 40 to be transported, the IP 40 remains in the first band portion 60 for a predeterminable time by braking the movements of the band loops 64a and 64b resposive to the signal from the position sensor 68.

After the radiograph has been taken on the IP 40 previously transported to the second band portion 62, and the exposed IP 40 has been transported to the receiving system 38, the IP 40 in the first band portion 60 is advanced via the light-tight roller assembly 36 to the second band portion 62 for the next radiograph. The same operation is repeated for the subsequent new IP 40 which is fed from the carrying roll unit 52 passing over the erasing apparatus 32.

The light-tight mechanism 36 is shown in FIGS. 2, 8a and 8b, and includes a guide plate 70, a light-tight roller 72 arranged adjacent the guide plate 70, and shutter plates 190 provided to maintain a light-tight environment surrounding the IPs 40 positioned outside the transport system 34. The light-tight roller includes a foam pad 198 having a coating such as made of urethone material on the outside surface of the roller 192 and is rotatably mounted on a shaft 196 via the paired bearings 194. The shaft 196 is mounted on a chassis 200 on which the anti-friction layer 202 is provided for preventing damage due to friction between the foam pad 194 and the chassis 200.

The IP 40 to be exposed is transported from the first band loops 64a and 64b to be grasped between the light-tight roller 72 and the guide plate 70, and the light-tight roller 72 rotates at a revolution rate corresponding to the transport speed of IP 40. The IP 40 is fed through the light-tight roller 72 to the second band loops 66a and 66b. The coating foam pad 194 deforms so as not to damage the phosphor layer of IP 40 as it passes through the light-tight roller 72. When the IP 40 passes between the light-tight roller 72 and the guide plate 70, the light-tight roller 72 rides on the phosphor layer of IP 40 and the substrate slips on the guide plate 70. The foam pad 194 acts as a cushion for the entering IP 40 to squeeze the IP 40 in connection with the guide plate 70, whereby the light-tight mechanism 36 protects the exposed IP 40 from the light of the erasing apparatus 32 during the transportation of the IP 40 through the light-tight roller 72.

The second portion 62 of the transport system 34 is shown in FIGS. 2, 9 and 10 and includes a pair of endless drive bands 66a and 66b arranged in close proximity to transport the IP 40 by holding the IP 40 therebetween. Each band 64a or 64b runs around a respective of paired drive roller drums 204 and 206. The entering and exiting portions of the band loops 66a and 66b are bent by arcuate guide plates 208 to continue the transport channel of the first band loops 64a and 64b and the feed path to the receiving magazine 80. The paired tension rollers 212 and 216 are provided for stretching the band loops 66a and 66b between the respective paired drive drums 204 and 206.

In FIGS. 9 and 10, the upper band 66a is formed of an X-ray transparent material, such an urethane, the width of which is substantially the same as that of the IP 40 for enclosingly covering the complete area of the IP 40. The bottom band 66b is formed of four strips of narrow bands which are rotated by the drive roller drums 206 at the same speed.

The arc portions 210 of the band loops 66a and 66b are separated by a predetermined distance sufficiently long to position the complete area of the IP 40 therebetween, and are formed by disposing the guide plate 208 along the inside of the bottom band loops 66b. When the IP 40 is sandwiched between the band loops 66a and 66b in the park position 58, the forward edge and back edge of the IP 40 are positioned in the respective arc portions 210 to be grasped tightly.

The paired follow rollers 212 and 216 are arranged to ride respective of band loops 66a and 66b, and are pivotably mounted on the shafts 214 and 218. Shafts 214 and 218 are shiftable in the forward direction of the band loops 66a and 66b to adjust the tension of the respective band loops 66a and 66b. The shift of the shaft 214 and 218 is achieved by any suitable means.

Referring now to FIGS. 3 and 9, the drive drums 204 and 206 and the follower rollers 214 and 216 are pivotably mounted on the carriage 98 which includes the sliders 102 in the side portion thereof for shifting along the guide rods 94 and 96 from the parked position to the exposure station 10 shown in FIG. 1. A motor (not shown) supplies the lateral shift of the carriage 98 along the guide rods 94 and 96 under control of the exposure control mechanism 132.

The IP 40 is transported from the first band portion 60 to the second band portion 62 through the light-tight roller assembly 36 at high-speed, and is sandwiched between the upper band 66a and the bottom band 66b to be fed to the park position under control of the second transport control mechanism 124. During being transported through the arcuate guide plates 208, the IP 40 is turned so that the phosphor layer of the IP 40 faces toward the X-ray source 22. When the IP 40 is positioned precisely between the arc portions 210 (corresponding to the park position), the drive of the drive drums 204 and 206 is stopped responsive to the signal from the second control mechanism 124. The IP 40 is grasped in the arc portions 210 rigidly because the parts of bands 66a and 66b corresponding to the arc portions 210 are stretched especially tightly along the guide plates 208. After that, the carriage 98 supporting the second band portions 62 of the transport system 34, which holds the IP 40, is moved laterally to the exposure station 10 for taking of a radiograph on the IP 40. The movement of the carriage 98 is perpendicular to the feed path for the IP 40 in the transport system 34, and is supplied by the motor 134 under control of the exposure control mechanism 132. The motor 134 is actuated responsive to the signal generated at the time when the X-ray button (not shown) is pushed by an operator.

The control of positioning the IP 40 precisely in the park position of the second band loops 66a and 66b is achieved to condition the motor 128 responsive to the detection of the forward or back end of IP 40 being transported by the position sensor 126 and the output of the rotary encoder 130 for monitoring a rotational position of the output shaft of the motor 128. For example, the required drive pulses are supplied to the motor 128, which corresponds to the distance (which is known) between the position sensor 126 and the forward end of the second band loops 66a and 66b.

The controller 108 acts as a timer for the exposure control mechanism 132 for feeding the unexposed IP 40 to the receiving system 38 without advancing the IP 40 to the exposure station unless the X-ray button is pushed in the predetermined time, such as several seconds, after starting to count at the time when the erasing operation has been completed in the erasing apparatus 32. Thereby, an IP which develops undesirable radiation energy on its fluorescent layer during the time it remains in the first band portion 60 of the transport system 34 is not used for a radiograph.

The receiving magazine 80 is depicted in FIGS. 11a–11c and 12a–12g. The receiving magazine 80 includes a light-tight enclosure 220 having sides 222, a top 224 having a disposing opening 226, a front 228, a back 230, and a floor 232. The disposing opening 226 of the receiving magazine 80, which is normally open in the load position in the spot shot apparatus 26, is closed by means of a sliding shutter 234 engaging guide grooves 236 in the sides plated 222 to hold the shutter 234 in engagement. A slot (not shown) is provided in the front plate 228 to facilitate the removal of the shutter 234 to the guide grooves 236 in the light-tight enclosure 220.

The magazine 80 is releasably locked into the spot shot apparatus 26 by a push button latching arrangement 238 which engages the mounting plate (not shown) of the apparatus 26 for securing the magazine 80 into the spot shot apparatus 26.

The receiving magazine 80 has a pair of spring biased shutter doors 240a and 240b rotatably mounted on the floor 232 for maintaining a light-tight enviroment in connection with the shutter 234.

Figure 11A:
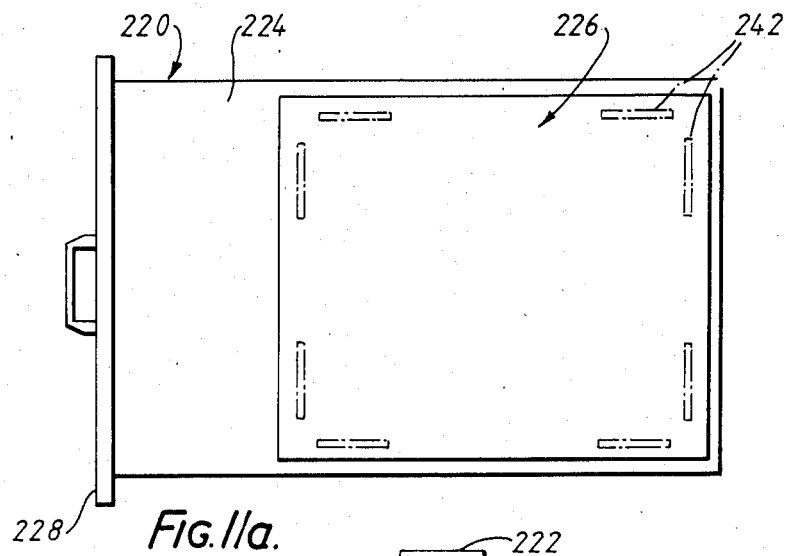
FIGS. 11a through 11c are respectively a top plan view and cross-sectional views of a receiving magazine.
Figure 11B:
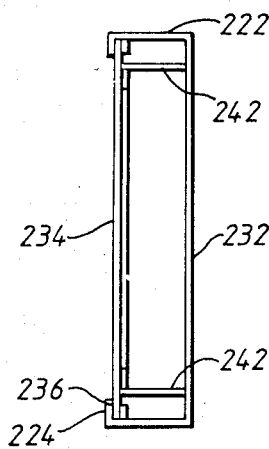
Figure 11C:
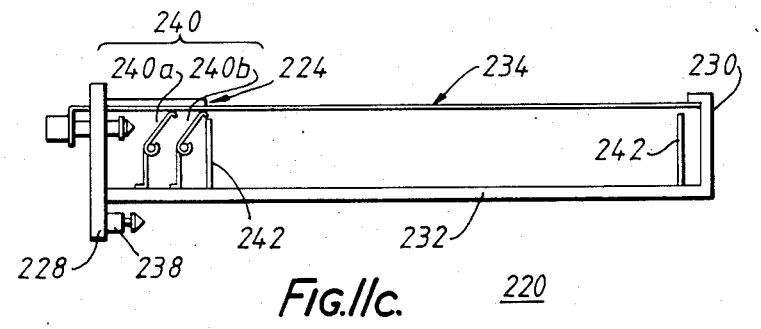

The foam pad ribs 242 are provided inside of the receiving magazine 80 for defining the stack area in the magazine 80 as shown in FIGS. 11a–11c. The foam pad ribs 242 act as a cushion for the entering IP 40 to absorb impact and noise.

The shutter 234 has a traverse wide strip of light-tight material and longitudinal narrow strips of light-tight material 244 attached on the inside surface thereof. The light tight material 244 engages the top of the shutter doors 240 when the shutter 234 slides in the guide grooves 236 in the side plates 222. The transverse wide strip of material 244 engages the shutter doors 240. The longitudinal strips of light tight material 244 are provided to be adjacent the grooves 236 to block any light which might otherwise enter through the grooves. Also, the light tight material 244, and particularly the longitudinal strips thereof, serve to dislodge any IP 40 which may become lodged in the opening defined by the slot. To that end, the entrance of the slot is irregularly shaped to match the contour of the portion of the shutter having the longitudinal strips of light tight material 224.

The top plate 224 includes a pair of notches 248 in the inside surface thereof for engaging the spring biased shutter doors 240. The spring biased shutter doors 240 rotatably block the slot defined by the shutter 234 and the bottom plate 232 and are forced open by the shutter 234 entering into the magazine 80. However, the shutter doors 240 are kept in contact with the inside surface of the shutter 234 due to the biased force as shown in FIGS. 12e, 13a–13d. Thereby, it is achieved to maintain a light-tight environment surrounding the exposed IPs 40 in the receiving magazine 80 without regard to loading or unloading of the magazine 80 into the spot shot apparatus 26.

Figure 12A:
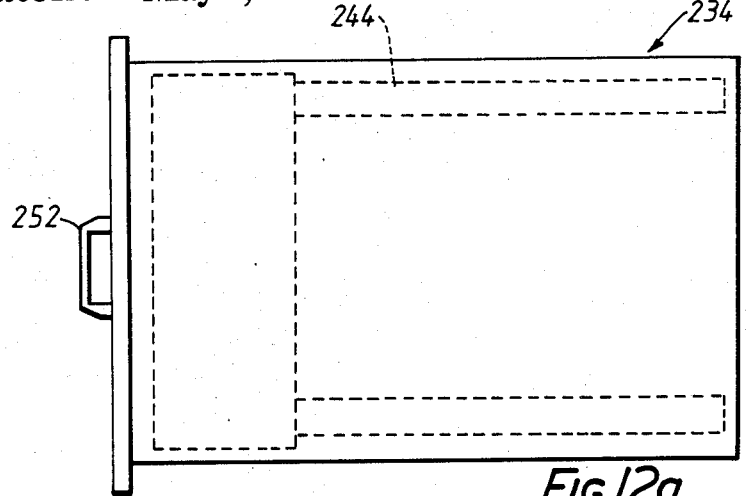
FIGS. 12a through 12g are various views illustrating the shutter arrangement for use in conjunction with the receiving magazine which is a light-tight enclosure.
Figure 12B:
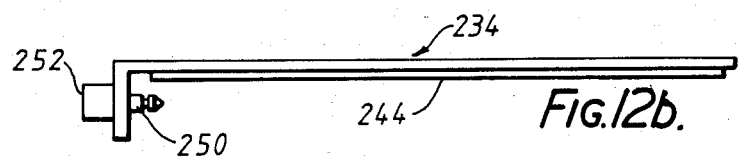
Figures 12C, 12D:
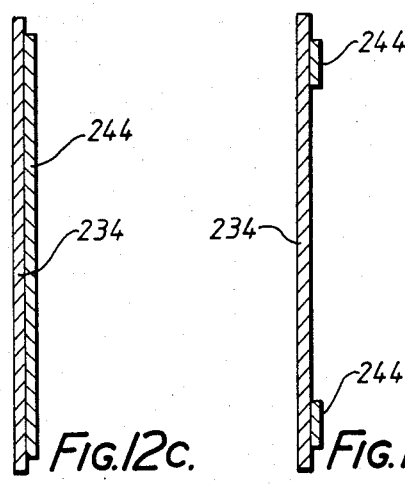

The shutter 234 includes a front edge portion bent perpendicular to the shutter face of the shutter 234 and a push button latching arrangement 250 which engages the front plate 228 of the magazine 80 for securing the shutter plate 234 in the magazine 80, and a hand grip 252 as shown in FIGS. 12a and 12b. Note that the front plate 228 does not have a handle, and carrying of the receiving magazine and removal thereof from the spot shot apparatus 26 is done by means of the shutter handle 252. In this way, accidental removal of the receiving magazine, without the shutter 234, is precluded from occuring.

Figure 12F:
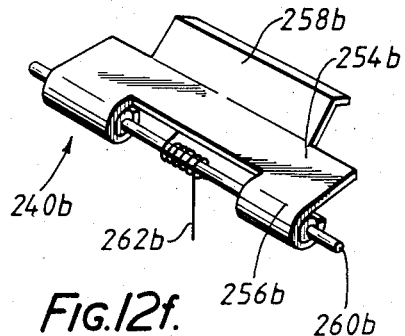
Figure 12E:
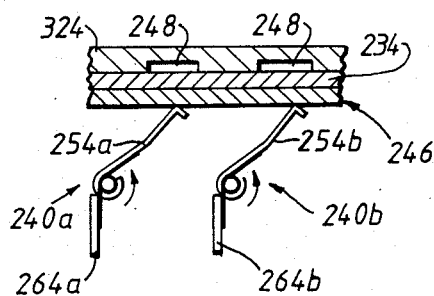
Figure 12G:
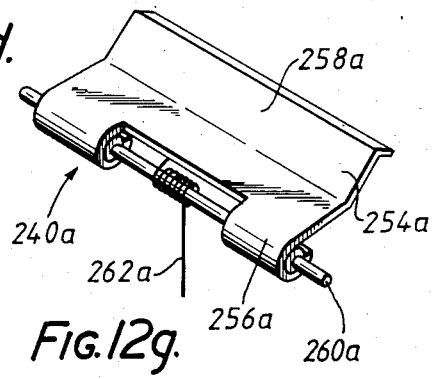
Figure 13A:
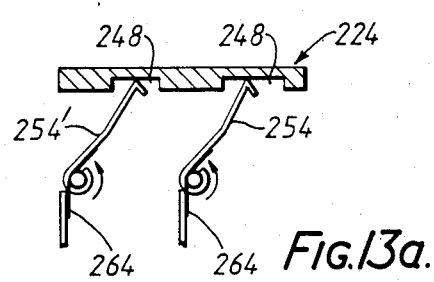
FIGS. 13a through 13d are partial cross-sectional views of the light-tight structure of the receiving magazine showing the light-tight operation in the receiving magazine.
Figure 13B:
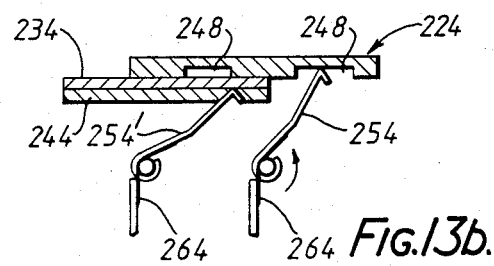
Figure 13C:
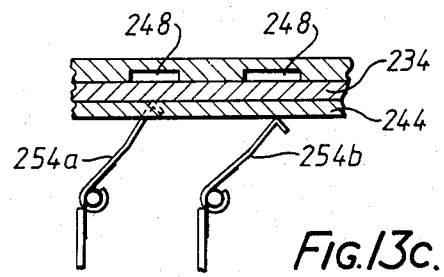
Figure 13D:
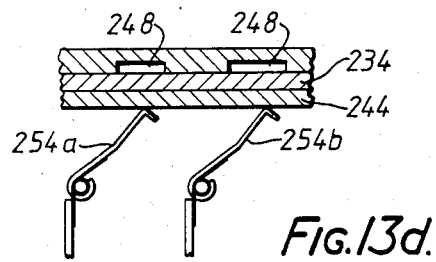

FIGS. 12e, 12f and 12g show a shutter door 240 including a swing plate 254 which has a support portion 256 and a bending portion 258 bent against the support portion 256 at a predetermined angle, and which is pivotably mounted on a pivot axis 260, and a spring 262 provided for urging the swing plate 254 in the direction opposite to the inlet direction of the shutter 234, such as counterclockwise as shown in FIGS. 12e and 12f. The both edge portions of the bending portion 258 are cut off for engaging the light-tight material 244 adhered on the inside surface of the shutter 234. The other shutter door 240 disposed near to the front plate 228 of the magazine 80 is substantially the same as the shutter door 240a described above, except for the notch to be provided in the edge portions of the bending top portion 258. Springs 262a and 262b urge the swing plates 254a and 254b opposite to the direction of shutter insertion. The swing plates 254a and 254b are mounted at the end of the supporting plates 264 which are mounted rigidly on the floor 232 of the magazine 80.

Operation of the shutter doors 240 is exemplified by the illustrations of FIGS. 13a-13d. The removable receiving magazine 80 is advanced to be in the park position as viewed in FIG. 2. This arrangement substantially shortens the overall dimensions of the spot shot apparatus 26. The empty receiving magazine 80 is inserted into the housing structure. The shutter 234 is removed from the light-tight enclosure 220 of the receiving magazine 80. After the removal of the shutter 234, the spring biased swing plates 254 and 254b engage the notches 248 in the top 224 of the receiving magazine 80 to maintain a light-tight environment as viewed in FIG. 13a. The shutter doors 240 which are positioned inside rotatably block the slit (not shown) for the removal of the shutter 234 from the receiving magazine 80. By providing the paired shutter doors 240 in series in the receiving magazine 80, it is achieved to maintain a completely light-tight environment surrounding the exposed IPs 40 stacked in the magazine 80.

After completion of exposure, the transport system 34 then is activated to remove the IP 40 from the exposure and park position and to deposit it in the receiving magazine 80. The exposed IP 40 fed from the ejector rollers 84 is urged perpendicular to the direction of the IP feeding by the spring biased press pad 86 and pressure mechanism 90, to be described hereinafter in detail, to prevent the arched uppermost IP on the stack from projecting into the inlet opening 226 of the magazine 80 and thus from disturbing the feeding process. A plurality of ribs 242 substantially surround the space for accommodating the exposed IP 40 to define a stack area in the magazine 80 and prevent the stack of IPs 40 from moving within the magazine 80 during transporting of the removed receiving magazine 80 so that the IPs 40 are not damaged due to any frictional interaction between IPs 40.

After serial radiographs have been taken on the plurality of IPs 40, which are transferred to the receiving magazine 80, the shutter 234 is reinserted and the magazine 80 is removed from the housing structure of the spot shot apparatus 26 for unloading the exposed IPs 40 in a darkroom. Before the removal of the magazine 80, as above noted the shutter 234 is inserted to shut the inlet opening 226 by engaging the grooves 236 in the sides 222. The spring biased shutter doors 240a and 240b are forced open by the insertion of the shutter 234, as viewed in FIG. 13b. The swing plates 254a and 254b of the shutter doors 240a and 240b slide over the light-tight material 244 provided on the inside surface of the shutter 234 to constitute light barriers arranged in series while the shutter 234 is inserted in or removed from the magazine 80, as viewed in FIGS. 13c and 13d. The shutter 234 is locked into the magazine 80 by a push button latching arrangement 250, and the other push button latching arrangement 238 provided in the front plate 228 of the magazine 80 is released from the housing structure of the spot shot apparatus 26 after the shutter 234 has been entirely inserted into the light-tight enclosure 220 of the receiving magazine 80. Thereafter the receiving magazine 80 which has been provided with a plurality of the exposed IPs 40 is carried out by means of the handle provided on the shutter 234 so that the exposed IPs 40 are processed to reproduce a visible image from the pattern of the stored image in the IP 40 by scanning with a stimulating ray. During carrying of the magazine 80, the stack of the IPs 40 is surrounded by the floor 232, the shutter 234 and the ribs 242, such that there is little space to allow the stack of IPs 40 to move therein as viewed in FIGS. 11b and 11c.

The feed mechanism for feeding the exposed IP 40 from the second portion 62 of the transport system 34 to the receiving magazine 80 through the ejector roller unit 84 includes a drive belt 76 riding in the belt pulleys 78 and a large diameter follower roll 82 which rides on the belt 76 to advance forward the exposed IP 40 by co-operating with the belt 76.

The IP 40 after passing through the feed mechanism in the form of a conveyor belt 76 is forwarded by an ejector roll unit 84 into the receiving magazine 80.

A spring-biased press pad 86 is arranged downstream in the feeding path behind the ejector roll unit 84. This press pad 86 is pivotable about the pivot axis 266 and spring 88 urges the pad 86 perpendicular to the direction of IP feeding. A pressure mechanism 90 presses the pad 86 so that the IP 40 transferred is loaded uniformly and directly i.e., without frictional dragging, onto the stack of the exposed IPs 40.

The press pad 86 is a plate which has a large enough size to cover the complete area of the IP 40. A spring 88 is connected to the pad 86 and to the housing structure for applying pressure to the pad 86 for urging it to follow the pressure mechanism 90.

Figure 14:
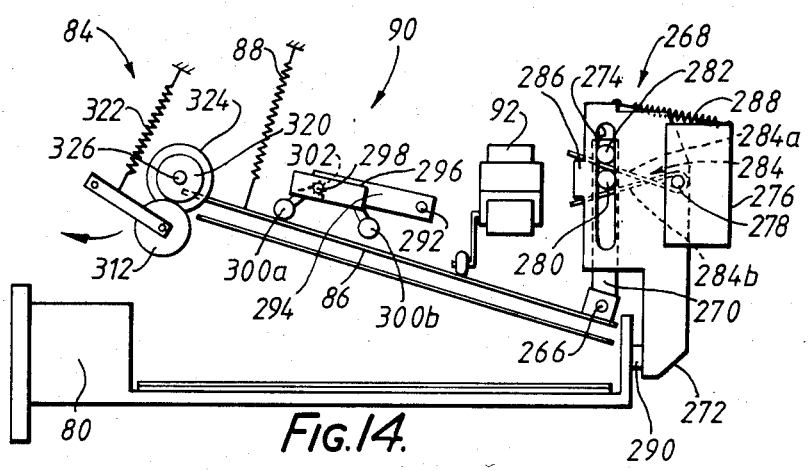
FIG. 14 is an enlarged elevational view of the receiving mechanism for the exposed stimulable phosphor sheet including the receiving magazine used in the transport and drive system of FIG. 2.

Referring to FIG. 14, a supporting assembly 268 on which the press pad 86 is pivotably mounted via the pivot axis 266 has a link 270 pivotably mounted on the axis 266, a guide frame 272 provided with a slot 274 and a mounting frame 276 on which the guide frame 272 is rotably mounted through the pivot shaft 278. The link 270 has a stationary pin 280, and an idle roller 282 which cooperate with a slot 274 so that the link 270 moves in the upward and downward directions. A twisted spring 284 disposed between the pivot shaft 278 and a stopper 286 provided on the guide frame 272 in manner as shown in FIG. 14 is provided to maintain the pin 280 in a predetermined position by urging the pin 280 upward and downward with the respective spring portions 284a and 284b. A spring 288 is connected to the guide frame 272 and to the mounting frame 276 for applying pressure to a pin 290 provided at the end of the guide frame 272 to urge pin 290 against the receiving magazine 80.

Figure 15:
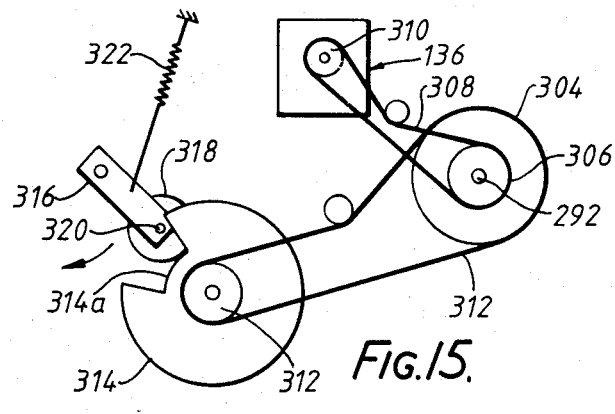
FIG. 15 is a schematic diagram showing a drive mechanism for the press pad for disposing an unexposed stimulable phosphor sheets into a receiving magazine used in the transport and drive system of FIG. 2.

The pressure mechanism 90 depicted in FIGS. 14 and 15 includes a drive shaft 292, a link 294 mounted to the shaft 292 at the end thereof, a connection 296 rotatably mounted to the pivot axis 298 which is disposed at the other end of the link 294, and press arms 300a and 300b arranged at the edge portions of the connection 296. A spring 302 is connected to the press arm 300a and the pivot axis 298 for urging the press arm 300a against the press pad 86. As viewed in FIG. 15, a large-diameter sprocket 304 and a small-diameter sprocket 306 are mounted on the drive shaft 292. The drive sprocket 306 is driven by a chain 308, which couples motion from the output sprocket 310 of the motor 136 to the sprocket 306. A chain 312 is stretched between the large-diameter sprocket 304 and a sprocket 312 which is mounted on a shaft. On this shaft, the sprocket 312 and a cam 312 are commonly mounted and rotated by the rotation of the shaft. A lever 316 is displaced by a lobe 314a on the cam 314 to cause displacement of a roller 318 which constitutes an ejector roller unit 84 in engagement with a pin 320 disposed in the edge portion of the level 316 in the direction indicated in FIG. 15. A spring 322 is connected to the lever 316 and the housing structure of the spot shot apparatus 26 for urging the lever 316 in the direction opposite to the direction of rotation of the cam 314.

Figure 16:
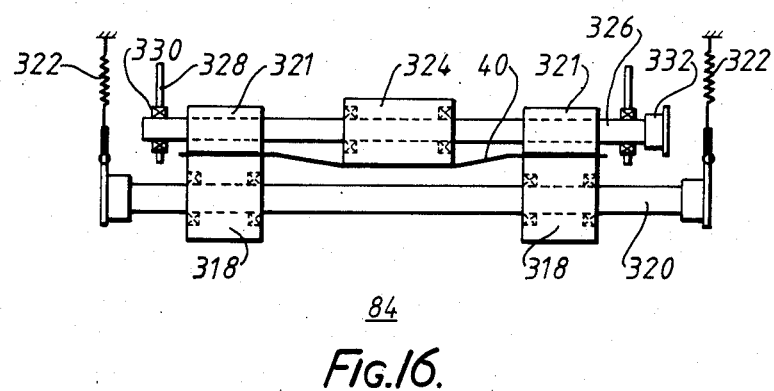
FIG. 16 is an end view showing an ejector roller arrangement for feeding an exposed stimulable phosphor sheets into the receiving magazine used in the transport and drive system of FIG. 2.

The ejector roller unit 84 is shown in FIG. 16. The ejector roller unit 84 is interposed between the feeding mechanism for feeding the exposed IP 40 fed by the transport system 34 to the receiving magazine 80 and the receiving magazine 80. The ejector roller unit 84 has a pair of lower rolls 318, a pair of upper rolls 321 which are urged to grip the exposed IP 40 in combination with the paired lower rolls 318 by function of the paired springs 322, and a corrugation roll 324 having a diameter larger than the diameters of the lower and upper rolls 318 and 320. Roll 324 is interposed between the upper rolls 320. The paired upper rolls 320 and corrugation roll 324 are mounted on the drive shaft 326 which is journaled to the frame members 328 of the housing structure via bearing 330. The drive shaft 326 carries a drive shaft sprocket 332 which is driven by a chain coupling a drive sprocket (not shown). As previously described referring to FIG. 15, the lower rolls 318 are mounted on the shaft 334 which is displaced to allow the unobstructed pressing down of the press pad 86.

Figure 17:
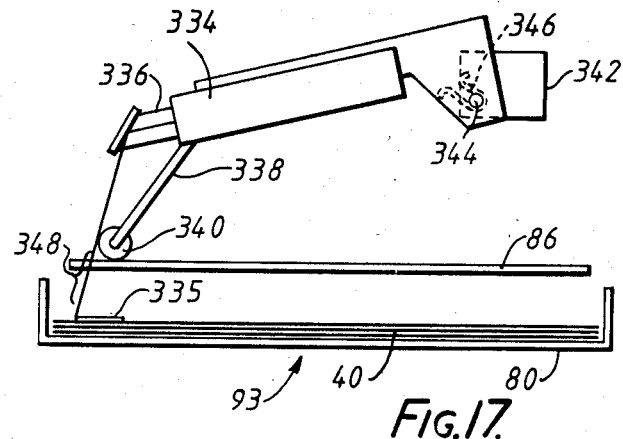
FIG. 17 is a side view of a bar code reader system for reading a bar-coded label adhered on the sheet stacked in the receiving magazine for use with the transport and drive system of FIG. 2.

The bar code reader system 92 is shown in FIG. 17. The bar code reader system 92 includes a bar code reader unit 334 for reading a bar-coded label 335 adhered to the surface of the IP 40, a housing structure 336 which includes a reflector (not shown), and an arm 338 having a roller 340 at the free end thereof. The bar code reader unit 334 is mounted pivotably to the frame members 342 about the pivot axis 344 and a spring 346 is provided for spring biasing the bar code reader unit 334 for urging it to follow the press pad 86. Due to the arm 338 in combination with the rotation of the bar code reader unit 334, the distance between the bar code unit 334 and bar-coded label 335 on the side opposite to the fluorescent layer of the IP 40 is maintained within a predetermined range 348 appropriate for reading the bar-coded label 335 with accuracy.

Figure 18A:
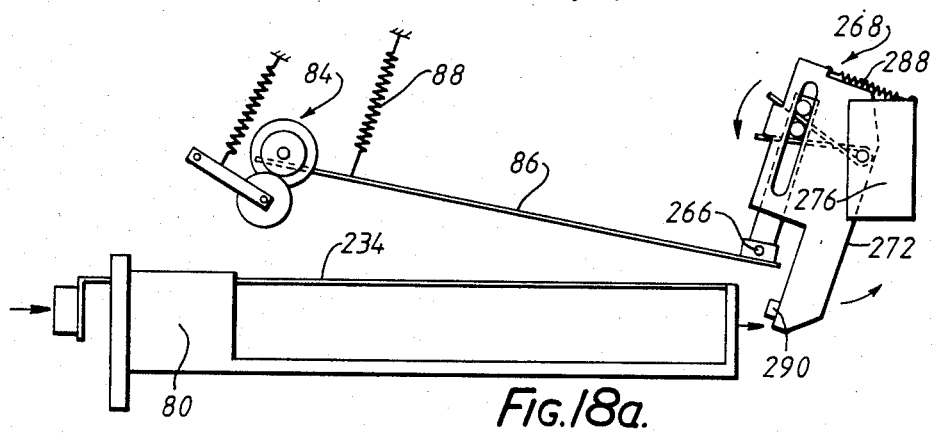
FIGS. 18a through 18c are side views showing the operation for mounting the receiving magazine in the radiographic system.
Figure 18B:
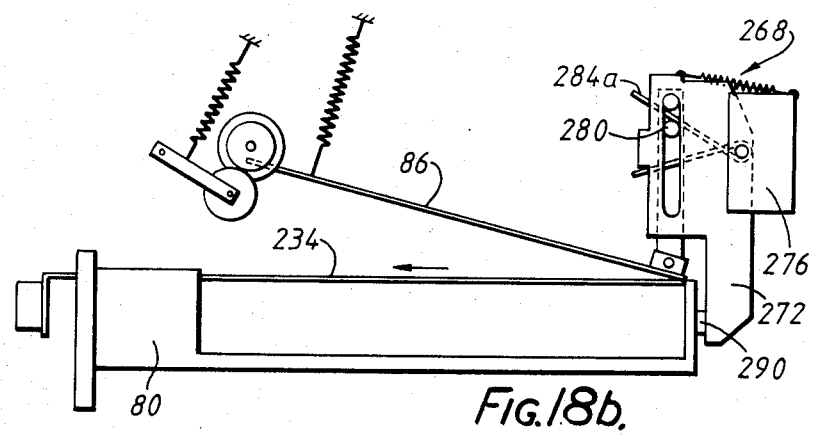
Figure 18C:
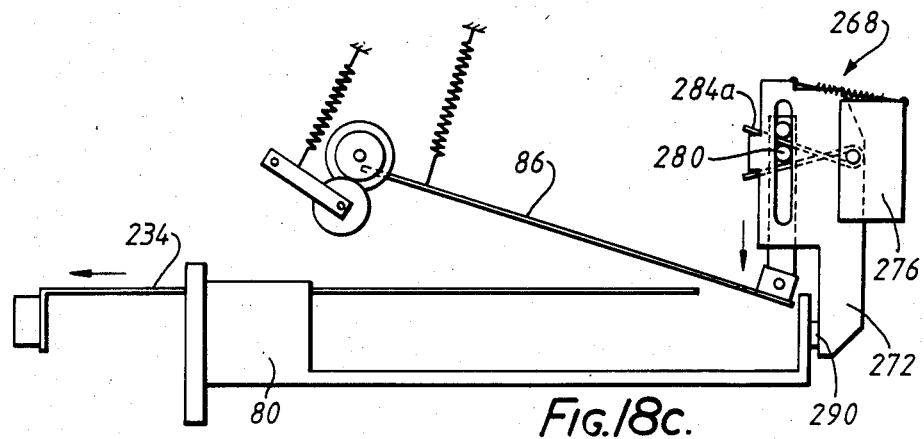

Operations of the press pad 86 assembly and the ejector roller unit 84 are viewed in FIGS. 18a–18c, 19a–19e and 20. Prior to inserting the receiving magazine 80 into the housing structure of the spot shot apparatus 26, the support in assembly 268 for supporting the press pad 86 is rotated at an angle by force of the spring 288 to facilitate the loading of the magazine 80 as viewed in FIG. 18a. By inserting the receiving magazine 80, the rear plate 230 of the magazine 80 pushes the pin 290 connected to the guide frame 272 so as to rotate the supporting assembly in a counterclockwise direction as viewed in FIG. 18b. In FIG. 18b, the edge portion 284a of the spring 284 urges the pin 280 which is connected to the press pad 86 through the link 270 downward. However, the downward movement of the press pad 86 is confined by the inserted shutter 234 in the magazine 80. When the shutter 234 is removed from the magazine 80, the spring 284 applies pressure to the pin 280 connected to the press pad 86 through the link 270 for descending the hinge portion of the press pad 86 as shown in FIG. 18c. The exposed IP 40 fed from the ejector roller unit 84 is discharged into the receiving magazine 80. When the receiving magazine 80 is removed from the housing structure of the spot shot apparatus 26, the operations as previously described are conducted reversibly.

The exposed IP 40 fed from the ejector roller unit 84 including the lower rolls 318, the upper rolls 321 and the corrugation roll 324 through the drive belt 74 in combination with the follower roller 82 is forwarded to the receiving magazine 80 backward along the press pad 86. The IP 40 which is advanced from the ejector roller unit 84 is corrugated to increase its rigidity, thereby the front edge of the IP 40 strikes the press pad 86 to be guided to the backward area of the magazine 80. During feeding through of the exposed IP, the ejector roller unit 84, the drive rolls 321 and the corrugation roller 324 run on the side opposite to the fluorescent layer of the IP 40, thereby frictional damage to the fluorescent layer of the radiation storing IP 40 is avoided.

Figure 19A:
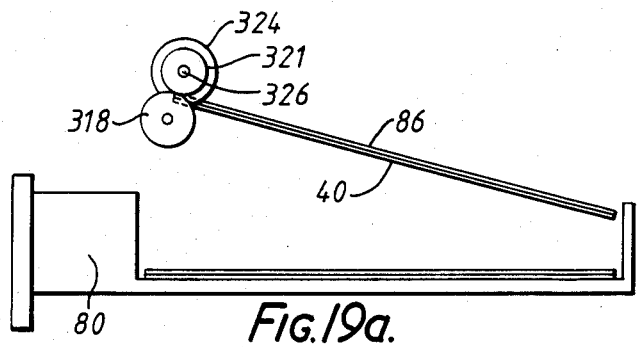
FIGS. 19a through 19d are side views showing the operation for disposing the exposed stimulable phosphor sheets into the receiving magazine.
Figure 19B:
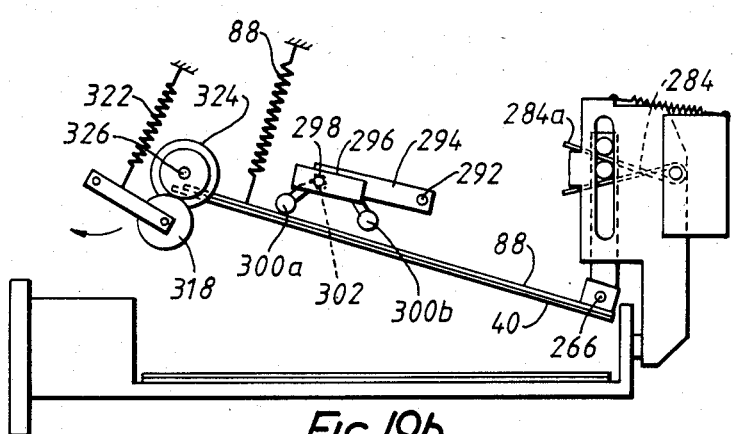
Figure 19C:
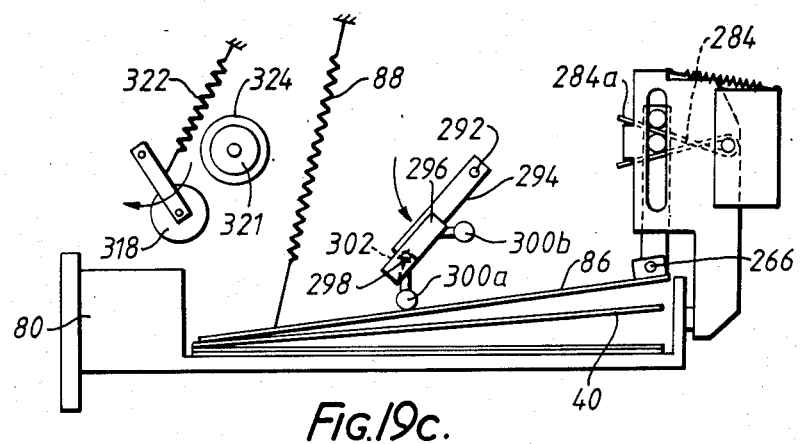
Figure 19D:
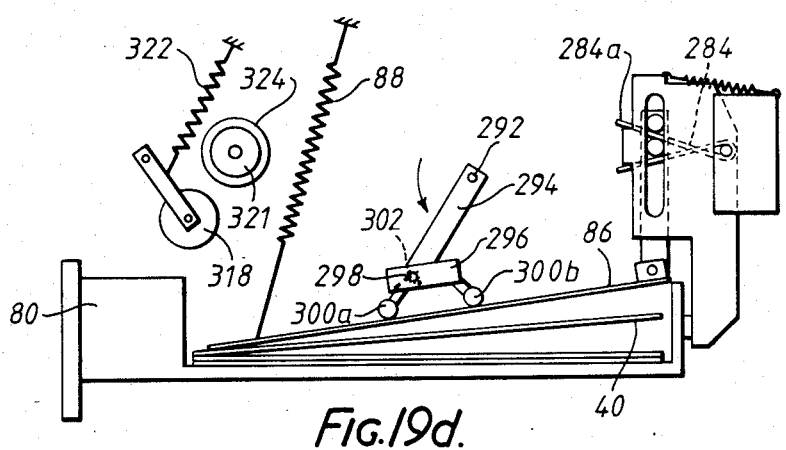
Figure 19E:
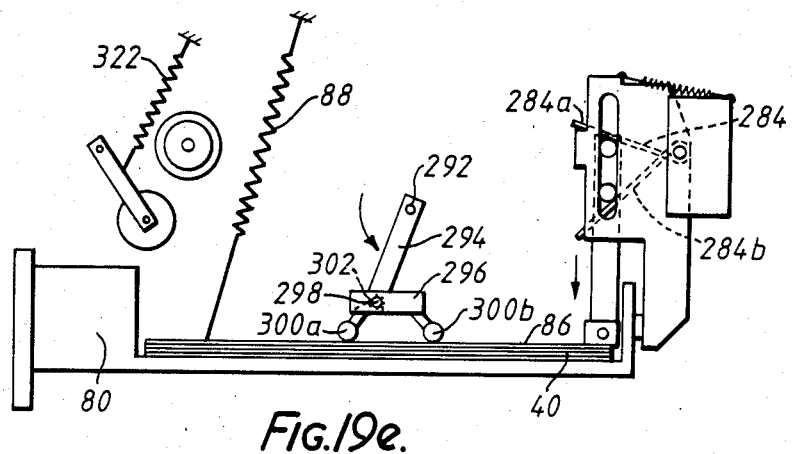
Figure 20:
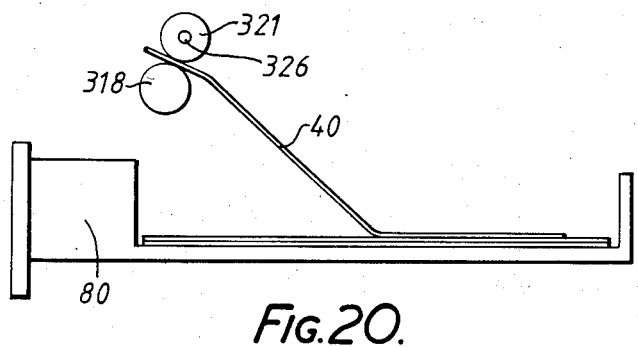
FIG. 20 is a cross-sectional view of the receiving magazine without corrugation rollers, and shows the movement of the sheet being deposited into the receiving magazine.

FIG. 20 shows the condition of discharging the IP on the stack of the exposed IPs 40 without using the corrugation roller 324. As understood from the illustration, the friction between the underlying exposed IP 40 and the IP 40 being fed arises due to bending of the IP 40 and resultant landing of the edge of IP 40 on the uppermost IP 40 a of the stack in the magazine 80. As shown in FIG. 19b, the shaft 292 is rotated by the motor 136, and the link 294 is rotated to cause the press pad 86 to rotate about the pivot axis 266 by pressing it by press arm 300a via the connection 296. The cam 314 is rotated in synchronization with the rotation of the shaft 292. This displaces the lever 316 and removes the lower rolls 318 in the direction shown in FIG. 19b. Prior to displacement of lever 316, roller 318 nips the exposed IP 40 in combination with the upper rolls 321 in the ejector roller unit 84. Displacement of lever 316 results in releasing nipping of the exposed IP 40, due to displacement of the roller 318 in the direction indicated in FIG. 19b. After that, the press pad 86 presses the complete area of the exposed IP 40 to place it on the stack of the IP 40 in the receiving magazine 80 in its straight form as shown in FIG. 19c. Further the shaft 292 rotates, and the press arm 300a pushes press pad 86 to press the rear end of the IP 40 being discharged into the magazine 80 toward the floor 232 of the light-tight enclosure. The shaft 292 rotates at a further angle, and the connection 296 rotates in the opposite direction to the direction in which the spring 302 urges it, thereby both press arms 300a and 300b push the press pad 86 by contacting as shown in FIG. 19d. The press pad 86 is pushed at two contact points by two press arms 300a and 300b downwardly toward the floor 232 of the light-tight enclosure, and the whole of the press pad 86 is descended to push the complete area of the IP 40 on the side of the IP opposite to the fluorescent layer of the IP 40 so as to dispose the IP 40 being fed on the stack of the exposed IPs 40 in the receiving magazine 80 with accuracy. Movement of the press pad 86 functions to press the discharging IP 40 from the rearward to the forward end sequentially into the stack area of the receiving magazine 80. The movement of the press pad 86, the removal of the rolls 318 and the scanning of bar code reader system 92 are synchronized precisely, and all these motions are actuated by a single motor 136. After completion of discharging the exposed IP 40 into the receiving magazine 80, the reversible motor 136 rotates in a reverse direction under control of the pressure control mechanism 138 to cause the press pad 86, the paired rolls 318 and the bar code reader system 92 to return to the initial positions for another exposed IP 40 to be fed from the ejector roller unit 84.

System Operation

The unexposed IP 40 is loaded in the supply magazine so that the side opposite to the fluorescent layer of the IP 40 faces upward. The vacuum suction devices 46 and 48 draw the uppermost IP 40 of the stack out of the magazine 42 one by one by suction applied to the side opposite to the fluorescent layer side of the IP 40. The drawn IP 40 passes over the erasing apparatus 32 to erase undesirable radiation energy stored in the IP 40 by emitting a light beam to the fluorescent layer of the IP 40. The IP 40 fed from the erasing apparatus 32 is advanced to strike the paired band loops 64a and 64b and turned upside down by being fed through the transport channel. When the IP 40 reaches the position sensor 68 disposed at the forward end of the first band portion 60 of the transport system 34, the IP 40 fed through the band loops 64a and 64b is stopped for a predetermined time period before being forwarded to the second band portion 62 of the transport system 34. After the period has passed, the IP 40 is fed through the light-tight roller assembly 36 to the second discrete, independent driving band portion 62 of the transport system 34.

The IP 40 fed from the light-tight roller assembly 36 is forwarded in the second transport channel formed by the paired band loops 66a and 66b and is turned with the fluorescent layer facing upward by being fed through the arc portion 210 arranged in the feed path. The position sensor 126 monitors the position of feeding of the unexposed IP 40, and the IP 40 is held in position to take a radiograph on the fluorescent layer of the IP 40 responsive to the output from the position sensor 126. When the X-ray button is pushed by an operator, the carriage 98 containing the unexposed IP 40 held by the band loops 66a and 66b is moved laterally to the exposure station in alignment with the X-ray source 22 for a radiograph. After completion of the radiograph, the carriage 98 is moved back to the park position so that the exposed IP 40 is fed to the receiving system 38 through the second band portion 62 of the transport system 34. The exposed IP 40 is forwarded by the second band portion 62 of the transport system and turned downside up by passing through the end arc portion 210 defined by arcuate plate portion 208 in the transport channel. The exposed IP 40 is fed from the transport system 34 to the ejector roller unit 84 through the feeding mechanism including the drive belt 76 and the follower roller 82 whereby the side opposite to the fluorescent layer side of the IP 40 faces upward when passing through the ejector roll unit 84. The ejector roller unit 84 feeds the exposed IP 40 into the receiving magazine 80 and the IP 40 discharged from the roll unit 84 is pushed by the press pad 86 on the entire surface area thereof. Thereby the exposed IP 40 which is discharged by the ejector roller unit 84 is placed on the top of the stack of the exposed IPs 40 in such manner that the side opposite to the fluorescent layer of IP 40 faces upward in the receiving magazine 80.

When a predetermined number of exposed IPs 40 have been loaded in the receiving magazine 80, the shutter 234 is inserted into the light-tight enclosure of the magazine 80 to maintain a light-tight environment surrounding the stack of the exposed IPs 40. The magazine 80 in which the light-tight environment is kept is removed from the housing structure of the spot shot apparatus 26 for processing the exposed IPs 40 to reproduce the visible images from the radiation pattern stored on the fluorescent layer of the IPs 40 by impinging a stimulable ray thereagainst by suitable means.

Although the invention has been described in its preferred form with a certain degree of particularity, it is understood that the present disclosure has been made only by way of example. For example, the embodiment utilizes the power controller of the phased-controlled type however it is possible to utilize suitable current control means to maintain the effective current constant by varying the voltage. Further, it is not limited to using triacs in the power controller 110 of the phased-controlled type, but other equivalent components instead of triacs can be used.

Obviously, numerous additional modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A system for making a radiation image on a stimulable phosphor sheet having a phosphor layer on one side thereof, comprising:
   a radiation source;
   a housing comprising,
   a stimulable phosphor sheet supply region having a substantially light-tight supply magazine including a bottom and in which a plurality of the stimulable sheets are stacked with the sides of the sheets opposite the phosphor layer side facing upward away from the bottom of the supply magazine, and
   a stimulable phosphor sheet collecting region having a substantially light-tight receiving magazine;
   a transport system contained within the housing structure for transporting the stimulable sheets in a predetermined direction serially from the supply magazine to an exposure position in which said radiation source directs radiation for taking a radiograph on said stimulable phosphor sheets and from the exposure position to the receiving magazine;
   a take-up and feeding means for taking-up one by one unexposed sheets from the supply magazine, said take-up and feeding means comprising plural suction means arranged in a line perpendicular to said predetermined direction for drawing an unexposed sheet out of said supply magazine, corrugation means disposed between said plural suction means in said line perpendicular to said predetermined direction for causing in combination with said suction means the drawn unexposed sheet to corrugate by contacting with said drawn sheet, and a sheet advance means disposed adjacent said supply magazine for feeding the taken-up unexposed corrugated stimulable phosphor sheet to said transport system while maintaining the taken-up sheet corrugated; and
   a discharging means for discharging the exposed sheet transported by said transport system to dispose the exposed sheets with the side opposite to the phosphor layer facing upward in the receiving magazine.

2. The system as defined in claim 1, wherein:
   said plural suction means comprises plural suction devices; and said corrugation means comprises one of said suction devices having a length longer than that of others of said suction devices, said one of said suction devices contacting with the surface of said stimulable phosphor sheet so as to corrugate said stimulable phosphor sheet.

3. The system as defined in claim 1, where said transport system comprises:
arcuate portions to cause an unexposed sheet fed from the supply magazine to turn upward with the phosphor layer facing the radiation source during feed of unexposed sheets to the exposure position and to cause the exposed sheets to turn with the side opposite to the phosphor layer facing upward during feed of exposed sheets to the receiving magazine.

4. The system as defined in claim 1, wherein said sheet advance means comprises:
pairs of opposed rolls arranged in a line perpendicular to said predetermined direction to clamp side portions of the corrugated stimulable phosphor sheet therebetween, and
a corrugation roll mounted between said pairs of rolls to corrugate said stimulable phosphor sheet in combination with said pairs of opposed rolls.

5. The system as defined in claim 2, wherein said sheet advance means comprises:
pairs of rolls arranged in a line perpendicular to said predetermined direction to clamp side portions of the corrugated stimulable phosphor sheet therebetween; and
a corrugation roll mounted between said pairs of rolls to corrugate said stimulable phosphor sheet in combination with said pairs of opposed rolls.

6. A system as defined in claim 4, wherein said corrugation roll has a diameter greater than the diameters of said pairs of opposed rolls.

7. A system as defined in claim 5, wherein said corrugation roll has a diameter greater than the diameters of said pairs of opposed rolls.

8. The system as defined in claim 1, wherein said corrugation means comprises a vacuum suction device to draw said stimulable phosphor sheet by using a vacuum effect, said corrugation vacuum suction device arranged to cooperate with said plural suction means and movable from a drawing-up position above the supply magazine to a position where the drawn stimulable phosphor sheet contacts said sheet advance means.

9. The system as defined in claim 1, wherein said corrugation means comprises:
a protruding part contacting the side of said phosphor sheet opposite the phosphor layer side to corrugate said sheet.

10. The system as defined in claim 9, wherein said sheet advance means comprises:
pairs of opposed rolls arranged in a line pependicular to said predetermined direction for clamping side portions of the corrugated stimulable phosphor sheet therebetween; and
a corrugation roll mounted between said pairs of rolls to corrugate said stimulable phosphor sheet in combination with said pairs of opposed rolls.

11. A system as defined in claim 10, wherein said corrugation roll has a diameter greater than the diameters of said paired rolls.

12. In a radiographic system wherein a stimulable phosphor sheet stored in a supply magazine is taken out of the supply magazine and transported in a predetermined direction to a radiation source for taking of a radiograph, a take-up and feeding means for taking-up and feeding said sheets from the supply magazine one by one, comprising:
plural suction means arranged in a line perpendicular to said predetermined direction for drawing one by one unexposed sheets from the supply magazine;
corrugation means disposed between said plural suction means in said line perpendicular to said predetermined direction for causing in combination with said suction means each drawn unexposed sheet to corrugate by contacting with said drawn sheet; and
a sheet advance means for feeding the corrugated taken-up unexposed sheet to a transport system while maintaining the corrugated taken-up sheet corrugated.

13. The system according to claim 12, wherein:
said plural suction means comprises plural suction devices; and
said corrugation means comprises one of said suction devices having a length longer than that of others of said suction devices, said one of said suction devices contacting with the surface of said stimulable phosphor sheet so as to corrugate said stimulable phosphor sheet.

14. The system according to claim 12, wherein said sheet advance means comprises:
pairs of opposed rolls arranged in a line perpendicular to said predetermined direction for clamping side portions of the corrugated stimulable phosphor sheet therebetween; and
a corrugation roll mounted between said pairs of opposed rolls to corrugate said stimulable phosphor sheet in combination with said pairs of opposed rolls.

15. The system according to claim 14, wherein said corrugation roll has a diameter greater than the diameters of said paired rolls.

16. The system according to claim 12, wherein said corrugation means comprises:
a vacuum suction device to draw said stimulable phosphor sheet by using a vacuum effect, said corrugation vacuum suction device arranged to cooperate with said plural suction means and movable from a drawing-up position above the supply magazine to a position where the drawn stimulable phosphor sheet contacts said sheet advance means.

17. The system according to claim 12, wherein said corrugation means comprises:
a protruding part contacting the side of said phosphor sheet opposite the phosphor layer side to corrugate said sheet.

18. The system as defined in claim 17, wherein said sheet advance means comprises:
pairs of opposed rolls arranged in a line perpendicular to said predetermined direction for clamping side portions of the corrugated stimulable phosphor sheet therebetween; and
a corrugation roll mounted between said pairs of opposed rolls to corrugate said stimulable phosphor sheet in combination with said pairs of opposed rolls.

* * * * *